(12) United States Patent
Kwan

(10) Patent No.: US 7,046,780 B2
(45) Date of Patent: *May 16, 2006

(54) EFFICIENT BUFFER ALLOCATION FOR CURRENT AND PREDICTED ACTIVE SPEAKERS IN VOICE CONFERENCING SYSTEMS

(76) Inventor: Katherine Wang Kwan, 1072 Wilmington Ave., San Jose, CA (US) 95129

( * ) Notice: Subject to any disclaimer, the term of this patent is extended or adjusted under 35 U.S.C. 154(b) by 30 days.

This patent is subject to a terminal disclaimer.

(21) Appl. No.: 10/831,958

(22) Filed: Apr. 26, 2004

(65) Prior Publication Data

US 2005/0025073 A1    Feb. 3, 2005

Related U.S. Application Data

(63) Continuation of application No. 09/768,320, filed on Jan. 25, 2001, now Pat. No. 6,728,358.

(51) Int. Cl.
*H04M 3/42* (2006.01)
*H04L 12/16* (2006.01)
*H04Q 11/00* (2006.01)

(52) U.S. Cl. .................. 379/202.01; 370/260; 370/267; 709/204

(58) Field of Classification Search .................. 379/202.01–206.01; 370/260–263, 266, 267; 709/204

See application file for complete search history.

(56) References Cited

U.S. PATENT DOCUMENTS

| | | | | |
|---|---|---|---|---|
| 4,658,398 | A | * | 4/1987 | Hsing .......................... 370/267 |
| 5,457,685 | A | * | 10/1995 | Champion ................... 370/260 |
| 5,473,363 | A | * | 12/1995 | Ng et al. .................. 348/14.09 |
| 6,104,706 | A | * | 8/2000 | Richter et al. ............... 370/263 |
| 6,418,125 | B1 | * | 7/2002 | Oran ........................... 370/266 |
| 6,584,077 | B1 | * | 6/2003 | Polomski ..................... 370/263 |
| 6,744,741 | B1 | * | 6/2004 | Ju et al. ...................... 370/260 |

\* cited by examiner

*Primary Examiner*—Benny Quoc Tieu
(74) *Attorney, Agent, or Firm*—Ward & Olivo (57) ABSTRACT

A method and computer program product allows for the efficient allocation of buffers (e.g., first-in first-out (FIFO) queues) for current and predicted active speakers in voice conferencing systems. The method and computer program product, implemented by a server hosting an audio conference for a plurality of speakers, minimizes the loss of audio data for speakers as they switch from "non-active" to "active" status. This is accomplished by employing a set of active speaker buffers and a set of predicted active speaker buffers. The predicted active speaker buffers maintain a collection of the most recent x packets or m milliseconds of "non-active" speaker audio data, and transfer a portion of the data from the predicted active speaker buffers to the active speaker buffers as speakers become "active" speakers. The x packets or m milliseconds of stored "non-active" speaker audio data can be used only up to a pre-determined jitter buffer fill-level in order to avoid introducing additional audio packet delivery delay to participants of the conference.

11 Claims, 4 Drawing Sheets

EFFICIENT BUFFER ALLOCATION FOR CURRENT AND PREDICTED ACTIVE SPEAKERS IN VOICE CONFERENCING SYSTEMS

CROSS REFERENCE TO RELATED APPLICATIONS

This application is a continuation of application Ser. No. 09/768,320, filed Jan. 25, 2001, now U.S. Pat. No. 6,728,358.

BACKGROUND OF THE INVENTION

1. Field of the Invention

The present invention relates generally to computer-based telephony networks and more particularly to servers that manage telephony conferencing.

2. Related Art

In today's technological environment, there exists many ways for several people who are in multiple geographic locations to communicate with one another simultaneously. One such way is audio conferencing. Audio conferencing applications serve both the needs of business users (e.g., national sales force meeting) and leisure users (e.g., audio chat room participants) who are geographically distributed.

Traditional audio conferencing involved a central conferencing server which hosted an audio conference. Participants would use their telephones and dial in to the conferencing server over the Public Service Telephone Network (PSTN) (also called the Plain Old Telephone System (POTS)).

In recent years, the possibility of transmitting voice (i.e., audio) over the worldwide public Internet has been recognized. As will be appreciated by those skilled in the relevant art(s), the connectivity achieved by the Internet is based upon a common protocol suite utilized by those computers connecting to it. Part of the common protocol suite is the Internet Protocol (IP), defined in Internet Standard (STD) 5, Request for Comments (RFC) 791 (Internet Architecture Board). IP is a network-level, packet (i.e., a unit of transmitted data) switching protocol.

Transmitting voice over IP (VoIP) began with computer scientists experimenting with exchanging voice using personal computers (PCs) equipped with microphones, speakers, and sound cards. VoIP has further developed with the adoption of the H.323 Internet Telephony Standard, developed by the International Telecommunications Union-Telecommunications sector (ITU-T), and the Session Initiation Protocol (SIP), developed within the Internet Engineering Task Force (IETF) Multiparty Multimedia Session Control (MMUSIC) Working Group.

Conferencing servers (also called multipoint control units (MCUs)) were developed to host audio conferences where participants are connected to a central MCU using PC-based equipment and the Internet, or using a telephone through a gateway, rather than traditional telephone equipment over the PSTN.

One common problem, however, exists in both MCUs that support Internet-based telephony and conferencing servers that support traditional PSTN-based telephony. This problem is now described (with conferencing servers and MCUs being referred to generally herein as MCUs).

MCUs, in general, enable multipoint communications between two or more participants in a voice conference. An MCU may support many conferences at one time, each of which have many participants. Each participant in a given conference will hear a mix of up to n active speakers, except for the active speakers themselves, who hear the mix minus themselves (this is, in essence, an "echo suppression" function so that a party will not "hear themselves speak" during the audio conference). For ease of explanation herein, and as will be appreciated by those skilled in the relevant art(s), the module in an MCU that does the active speaker detection, mixing or multiplexing, switching and streaming of the audio is referred to herein as the "Mixer."

In the case where the Mixer needs to do mixing of multiple audio streams or accept different packet sizes from different participants, the Mixer needs a buffer (i.e., a memory storage area) in which to receive audio data. This buffer may be large if it also needs to accommodate jitter (the random variation in the delivery time) in packet arrival times. From a memory standpoint, it would be most efficient to assign buffers only to the active speakers rather than to all participants in a conference, and to reassign the buffers as the active speakers change. However, there is a drawback to only collecting data for the active speakers. Often times, the active speaker update event within a Mixer does not detect a new active speaker until enough "loud" packets have gone by to trigger the selection of the speaker as a new active speaker. This can cause the first word to be partially lost in the new active speaker's audio stream.

Therefore, given the above, what is needed is a method and computer program product for the efficient allocation of buffers for current and predicted active speakers in voice conferencing systems.

SUMMARY OF THE INVENTION

The present invention is directed to a method and computer program product for the efficient first-in first-out FIFO (i.e., queue) allocation for current and predicted active speakers in voice conferencing systems, that meets the above-identified needs.

The method and computer program product of the present invention receive a packet from a speaker participating in a conference, wherein the speaker is not currently designated as an "active" speaker nor as a "predicted active" speaker. Then, a first test is applied to determine whether the speaker should now be designated as a "predicted active" speaker. The test is a comparison between the energy measurement of the packet (or the speaker's energy averaged over some pre-determined time period and including such packet) and any one of numerous possible functions of the energies of the current "active" or "predicted active" speakers. The method and computer program product of the present invention discard the packet when the packet fails the first test. If the packet passes the first test, the steps described below are performed.

First, a determination is made as to whether there is an unallocated buffer from among a set of p "predicted active" speaker buffers. If so, the packet is stored in the unallocated buffer. If not, a determination is made, by using a second test on the packet, whether the speaker should now be designated as a "predicted active" speaker, thereby replacing a current predicted active speaker using one of the set of p "predicted active" speaker buffers. The second test, like the first, is a comparison between the energy measurement of the packet (or the speaker's energy averaged over some pre-determined time period including such packet) and any one of numerous possible functions of the energies of the current "active" or "predicted active," speakers, although with a higher threshold than the first test.

Next, the packet is discarded if it fails the second test. If it passes the second test, a buffer from the set of p "predicted active" speaker buffers that can be reassigned is identified and the packet is then stored in the identified buffer. At this point the speaker is considered a "predicted active speaker" and data received from that speaker will be received into their predicted active speaker buffer.

Once that speaker becomes an "active speaker," some of the data from their predicted active speaker buffer will be used as their active speaker data. (One way of doing this is to make that speaker's predicted active speaker buffer an active speaker buffer.) In an embodiment, the portion of the data used is equal to M−J packets, where M is a predetermined desired jitter buffer depth and J is the current jitter buffer depth, assuming M>J. If M≦J, none (i.e., zero packets) of the data from that speaker's predicted active speaker buffer is used. This minimizes the loss of audio data for speakers as they switch from "non-active" to "active" status and ensures that the delay introduced by fist using the speaker's data that has been saved into their predicted active speaker buffer is never more than the desired jitter buffer depth M.

An advantage of the present invention is that it minimizes the loss of audio data for speakers as they switch from "non-active" to "active" status by collecting audio data from those speakers before they are actually active. This is done in a memory efficient manner and without introducing additional delay.

Another advantage of the present invention is that it provides a method of predicting future active speakers to limit the amount of non-active speaker data collected by an MCU.

Another advantage of the present invention is that it provides a method for maintaining a collection of the most recent x packets or m milliseconds of "non-active" speaker audio data in single or multiple buffers, and using this data in the event that the non-active speaker becomes an active speaker.

Yet another advantage of the present invention is that the x packets or m milliseconds of stored "non-active" speaker audio data can be used only up to a pre-determined jitter buffer fill-level in order to avoid introducing additional audio packet delivery delay.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

I. System Architecture Overview

This present invention is directed to a method and computer program product for the efficient first-in first-out (FIFO) (i.e., queue) allocation for current and predicted active speakers in voice conferencing systems that minimizes the loss of audio data for speakers as they switch from "non-active" to "active" status.

In a preferred embodiment of the present invention, a service provider supplies the infrastructure (i.e., a site of MCUs), agreement terms and facilities so that clients (i.e., participants) who subscribe to their conferencing services can take part in a multi-party audio conference application. The service provider would also provide customer service, support and billing as will be apparent to one skilled in the relevant art(s) after reading the description herein. The clients would connect to the server using whatever equipment (e.g., PC, telephone, etc.) and protocol (e.g., PSTN, SIP, H.323, etc.) they currently have access to.

Figure 1:
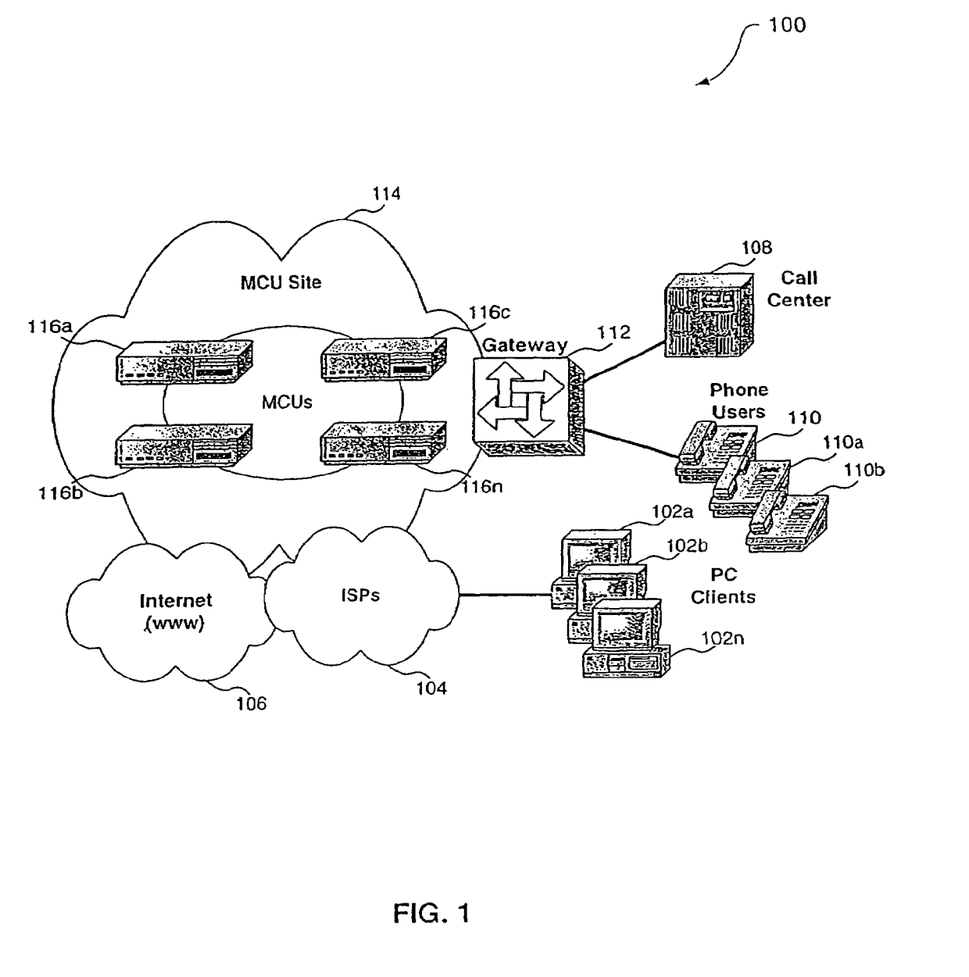
FIG. 1 is a block diagram illustrating the overall system architecture of an embodiment of the present invention, showing connectivity among the various components.

Referring to FIG. 1, a block diagram illustrating the system architecture of an embodiment of the present invention, showing connectivity among the various components, is shown. More specifically, FIG. 1 illustrates a network architecture 100 that supports both IP-based and phone-based conferencing. Architecture 100 includes a plurality of PC-based clients 102 (shown as clients 102a–102n) which connect to a wide area network (e.g., the public Internet and thus, the World Wide Web (WWW)) 106, via a mid-level network 104 typically operated by an Internet Service Provider (ISP). The wide area network 106 is connected to the service provider's MCU site facility 114 which includes a plurality of conferencing servers or MCUs 16 (shown as MCUs 116a–n).

Architecture 100 also includes a plurality of telephone-based clients 110 (shown as clients 110a–110n) which connect to a gateway 112 via the PSTN (i.e., circuit-switched network). The gateway 112 is connected to the service provider's facility 114 that includes the plurality of MCUs 116.

Each MCU 116 contains one or more instantiations of a Mixer (not shown), as described herein, with the capability to handle one audio conference for clients 102 and/or users 110.

Architecture 100 also includes a call center 108 operated by the service provider in order to provide the conferencing functionality, customer service, customer support and billing functions as will be apparent to one skilled in the relevant art(s) after reading the description herein.

The present invention is described in terms of the above example. This is for convenience only and is not intended to limit the application of the present invention. In fact, after reading the following description, it will be apparent to one skilled in the relevant art(s) how to implement the following invention in alternative embodiments (e.g., one or more of the MCUs 116 handling protocols and equipment other than those illustrated herein).

While only one gateway 112 is shown in FIG. 1, it will be apparent to one skilled in the relevant art(s) that system 100 may utilize one or more gateways 112 in a distributed fashion (or possibly mirrored for fault tolerance) connected via a local or wide area network. In such an embodiment, as will be apparent to one skilled in the relevant art(s) after reading the description herein, each gateway 112 could be dedicated to, and support connections from, a specific type of client 102 or user 110 (and possibly using a different communications network than the global Internet 106 or PSTN, such as a private IP network).

Lastly, while one call center 108 is shown in FIG. 1 for ease of explanation, it will be apparent to one skilled in the relevant art(s) that system 100 may utilize one or more call centers physically located in different locations and controlling one or more MCU sites 114, each having a plurality of MCUs 116.

More detailed descriptions of system 100 components, as well as their functionality, are provided below.

The terms "client," "party," "participant," "user," "speaker," and the plural form of these terms may be used interchangeably throughout herein to refer to those who would access, use, and/or benefit from the method and computer program product for the efficient, FIFO allocation of current and predicted active speakers in voice conferences of the present invention.

II. FIFO Architecture

Figure 2:
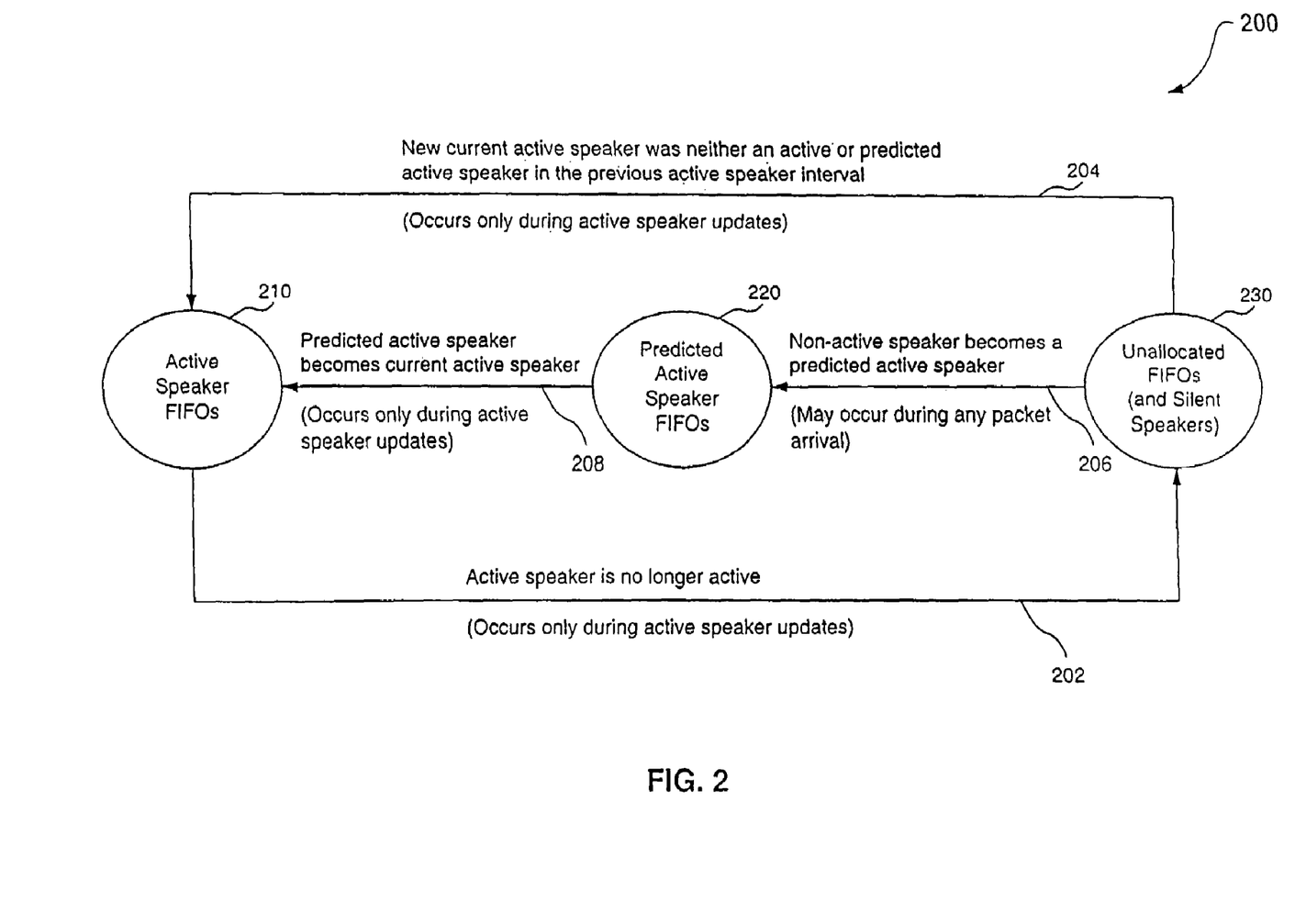
FIG. 2 is a state transition diagram illustrating events that direct audio data packets within the FIFO architecture of a Mixer according to an embodiment of the present invention.

Referring to FIG. 2, a state transition diagram 200, according to an embodiment of the present invention, is shown. Diagram 200 illustrates three groups of FIFOs (i.e., "states" 210, 220 and 230) within MCU 116 and events (i.e., "transitions" 202–208) which direct data packets to and from such FIFO groups. The three groups of FIFOs include "active speaker" FIFO group 210, "(allocated) predicted active speaker" FIFO group 220 and "unallocated predicted active speaker" FIFO group 230.

During an audio conference, MCU 116 will continuously receive audio packets from the participants of the conference. However, on a pre-determined time interval or only when a pre-determined total number of packets have been received by MCU 116 (i.e., a scheduled active speaker update event), the list of "active" speakers will need to be updated. As will be apparent to one skilled in the relevant art(s), if a conference has N participants, the server will only allow a certain n number of speakers to be considered "active" (i.e., those participants who are actually speaking rather than simply listening). (Where, for example, n=3<<N.) This is because if the number of active speakers is too large, the data being sent by the server 116 to every N participant in the audio conference will be unintelligible (i.e., too many participants speaking on top of each other).

Thus, in one embodiment, "active speaker" FIFO group 210 will include n FIFOs (i.e., queues), the "predicted active speaker" FIFO group 220 will include a total of p FIFOs, and the "unallocated" FIFO group 230 will include a total of u FIFOs, where:

$$(p+u) \leq n.$$

For example, in an embodiment, MCU 116 may host an audio conference with N=15 participants, and only allow a maximum of n=3 active speakers at once. At a given moment in time during the conference, there may be actually three active speakers where each is allocated to one of the three FIFOs in group 210. Further, there may be only one of the participants who is a "predicted active speaker," and the eleven remaining participants are "silent." In such a situation, there would be p=1 FIFO in group 220 and u=2 FIFOs in group 230 (i.e., (p+u)≤n). That is, there is a total of three "predicted speaker" FIFOs, one in allocated group 220 and two in unallocated group 230 (i.e., (1+2)≤3)

Referring again to FIG. 2, a transition 202 would occur when an active speaker participant ceases to be "active" speaker and becomes a "non-active" speaker. Transition 202 ensures that the speaker's audio packets are no longer received into one of the n queues within "active speaker" FIFO group 210. Transition 202 would only occur within the MCU 116 during an active speaker update event.

A transition 204 would occur when a "non-active" participant becomes an "active" speaker. Transition 204 ensures that the speaker's audio packets are now received into one of the n queues within "active speaker" FIFO group 210. Transition 204 would only occur within the MCU 116 during an active speaker update event.

A transition 206 would occur when a "non-active" participant becomes a "predicted active" speaker. Transition 206 ensures that the speaker's audio packets are now received into one of the p queues within "predicted active speaker" FIFO group 220. (More specifically, one of the u unallocated FIFOs in group 230 is moved to group 220.) Transition 206 can occur within the MCU 116 during any packet arrival event (i.e., not only during active speaker update events).

A transition 208 would occur when an "predicted-active" participant becomes an "active" speaker. Transition 208 ensures that the speaker's audio packets are now received into one of the n queues within "active speaker" FIFO group 210. Transition 208 would only occur within the MCU 116 during an active speaker update event and consequently frees one of the FIFOs in group 220 for another party or it becomes part of the u unallocated FIFOs in group 230.

It is important to note, as will be appreciated by those skilled in the relevant art(s) after reading the description herein, that a newly designated "predicted active speaker" cannot become an "active" speaker until an active speaker update event. Further, simply being designated a "predicted active speaker," and the collection of data into a group 220 FIFO, does not assure such a speaker will ever become an "active" speaker, although the probability of such an event is high.

III. System Operation

A. FIFO Allocation

As mentioned above, each MCU 16 contains one or more instantiations of a Mixer with the capability to handle one audio conference for clients 102 and/or users 110.

Figure 3:
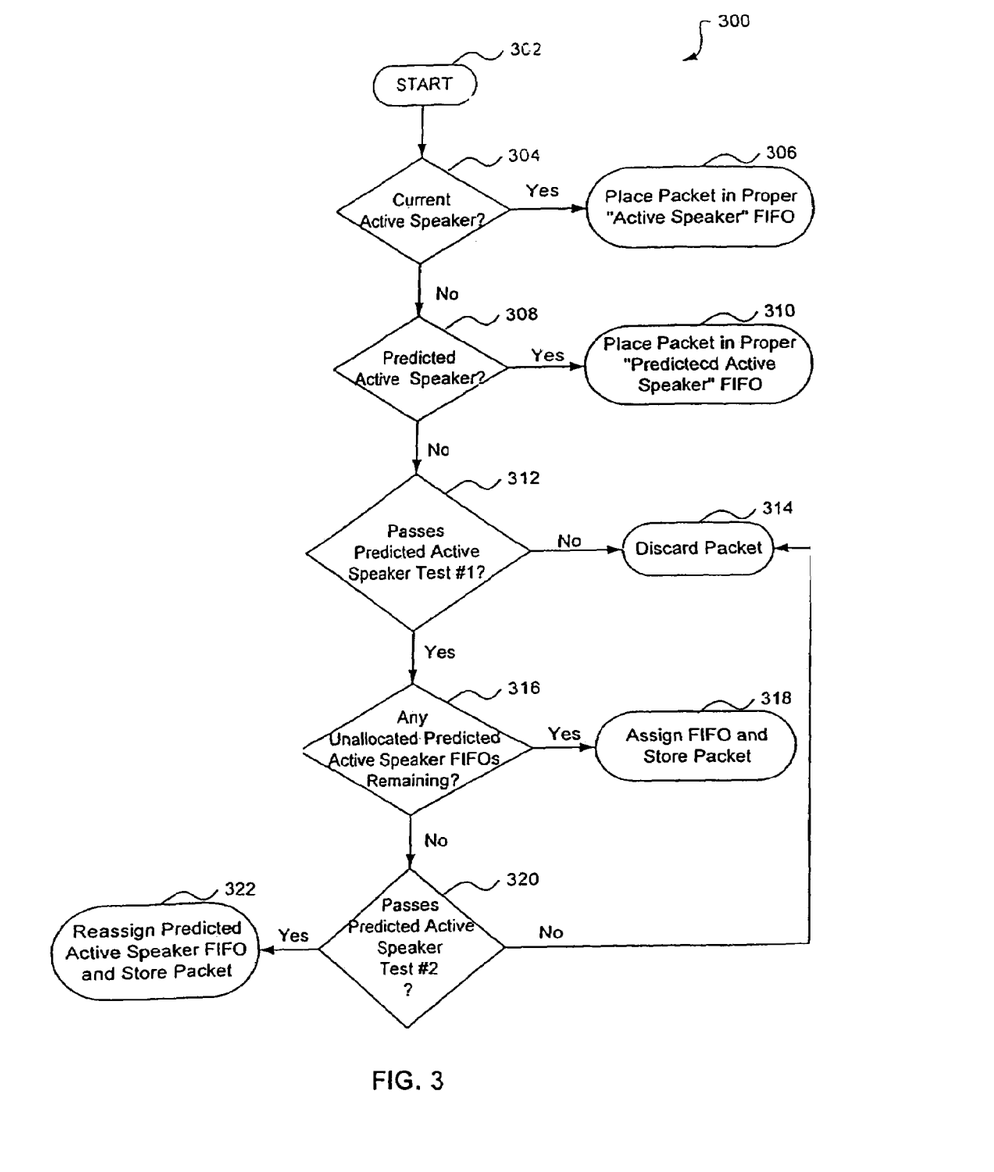
FIG. 3 is a flowchart representing the general operational flow according to an embodiment of the present invention.

Referring to FIG. 3, a flowchart representing part of the general operational flow, according to an embodiment of the present invention, is shown. More specifically, FIG. 3 depicts an example control flow 300 involved in the Mixer providing the efficient FIFO allocation for current and predicted active speakers. Control flow 300 begins at step 302, with control passing immediately to step 304.

In step 304, MCU 116 receives a packet from one of the N participants of an audio conference. Then, the determination is made as to whether that speaker is one of the n "active" speakers. In an embodiment of the present invention, MCU 116 would contain a data store (e.g., database, list, linked list, table, flag or the like) of audio conference participants and a designation as to which are "active" speakers (as well as "predicted active speaker," "silent," etc.).

In step 306, if the determination of step 304 is positive, the data packet is placed in that speaker's allocated queue in the active speakers FIFO group 210.

In step 308, if the determination of step 304 is negative, the determination is made as to whether that speaker is currently one of the n "predicted active" speakers.

In step 310, if the determination of step 308 is positive, the data packet is placed in that speaker's allocated queue in the "predicted active speakers" FIFO group 220.

In step 312, if the determination of step 308 is negative, the determination is made as to whether that speaker can now be considered a "predicted active speaker." That is, the energy level of the received data packet is tested to determine if:

$$\text{Energy}_{packet} > F_1(k, i \text{ active speaker energies});$$

where $F_1(\ )$ is a function of a number k and the current i (where $i \leq n$) active speakers' energies, and $\text{Energy}_{packet}$ can be measured by many well-known methods as will be appreciated by those skilled in the relevant art(s).

Before calculating $F_1(\ )$, as will be apparent to one skilled in the relevant art(s), an energy level is first calculated for each packet within the active speaker buffer for each of the current i active speakers. Then, an arithmetic mean or weighted mean is calculated for the entire FIFO for each of the current i active speakers. Only then can $F_1(\ )$ be calculated using these i energy measurements (i.e., $\text{Energy}_{FIFO\ 1}, \ldots, \text{Energy}_{FIFO\ i \leq n}$). While these computations are necessary before calculating $F_1(\ )$, in an embodiment, they require no additional computational overhead within the Mixer as such calculations are nonetheless needed during the active speaker update events.

In one embodiment, $F_1(\ )$ is equal to:

k% of the arithmetic mean of the current i active speakers' energies.

For example, in one embodiment, k%=50%. In another embodiment, a weighted mean of packet energy values where more recently received packets in the i active speaker buffers are weighted more heavily than those received earlier may be used.

In another embodiment, $F_1(\ )$ is equal to:

k% of the min [energy of active speaker 1, . . . , energy of active speaker i].

In yet other embodiments, $F_1(\ )$ is a function of a number k and the current i (where $i \leq p$) predicted active speakers' energies and can also take one of the two forms described above.

In step 314, if the determination of step 312 is negative, the speaker's packet is simply discarded. This is because the speaker is neither a current nor has become an "active" speaker or "predicted active" speaker. Thus, the Mixer within MCU 116 does not have to concern itself with the received packet.

In step 316, if the determination of step 312 is positive, it is determined whether there are any unassigned FIFOs within the "unallocated predicted active speaker" FIFO group 230 (i.e., are there any of the u FIFOs remaining in group 230).

In step 318, if the determination of step 316 is positive, an unassigned FIFO within the "unallocated predicted active speaker" FIFO group 230 is now assigned to the speaker and the received packet is stored in the newly-assigned FIFO. That FIFO now becomes part of "predicted active speaker" FIFO group 220 (i.e., p=p+1; and u=u−1).

In step 320, if the determination of step 316 is negative, a second test (similar to the first test of step 312) is employed to determine whether the speaker can now be considered a "predicted active speaker." That is, the energy level of the received data packet is tested to determine if:

$$\text{Energy}_{packet} > F_2(j, i \text{ active speaker energies});$$

where $F_2(\ )$ is a function of a number j and the current i (where $i \leq n$) active speakers' energies. In one embodiment, $F_2(\ )$ is equal to:

j% of the arithmetic mean of the current i active speakers' energies;

where j>k (in step 312). For example, in one embodiment, j%=75%. In another embodiment, a weighted mean of packet energy values where more recently received packets in the i active speaker buffers are weighted more heavily than those received earlier may be used.

In another embodiment, $F_2(\ )$ is equal to:

j% of the min [energy of active speaker 1, . . . , energy of active speaker i];

where j>k (in step 312).

In yet other embodiments, $F_2(\ )$ is a function of a number j and the current i (where $i \leq p$) predicted active speakers' energies and can also take one of the two forms described above.

In step 322, if the determination of step 320 is positive, an assigned FIFO within the "predicted active speaker" FIFO group 220 is now reassigned to the speaker and the received packet is stored in the newly reassigned FIFO. Which of the p assigned FIFOs within group 220 is reassigned is determined by, in one embodiment, the participant with the weakest energy measures across their FIFO in group 220. In another embodiment, the reassignment is based upon a weighted measure of energy values where more recently received packets are weighted more heavily than those received earlier.

If the determination of step 320 is negative, the speaker's packet is simply discarded in step 314.

As will be appreciated by one skilled in the relevant art(s), steps 302–322 are performed by the Mixer for each of the N participants in the audio conference. Thus, control flow 300 would continue until the server (MCU 116) ceases to host the audio conference (i.e., the conference is over and terminated).

B. Loss Audio Data and Delay Minimization

Given that control flow 300 illustrates the allocation of packets that are continuously received by MCU 116 during an audio conference, the minimization of lost audio data for speakers as they switch from "non-active" to "active" status is now detailed.

As mentioned above, if a "predicted active" speaker becomes a current "active" speaker during an active speaker update event, transition 208 ensures that the speaker's audio packets are now received into one of the n queues within "active speaker" FIFO group 210. More specifically, however, the data within its "predicted active speaker" FIFO becomes its "active speaker" FIFO data. This is accomplished by assigning an active speaker FIFO from group 210 to that speaker.

In an embodiment, in order to assure the above process introduces no additional delay in active speaker data packet delivery to the N participants of the audio conference, the following is done. First, a variable J is defined as the current jitter buffer depth. Then, during transition 208, only M−J packets from the "predicted active speaker" FIFO within group 220 is transferred to the newly assigned "active speaker" FIFO within group 210; where M is a pre-determined desired jitter buffer depth and J is the current jitter buffer depth, assuming M>J. If M≤J, no packets are transferred. This will ensure, as will be appreciated by one skilled in the relevant art(s), that no additional delay is added.

Typically, the jitter buffer will be low if the speaker starts speaking after an interval of silence, so some of the audio packets will be used.

In an alternate embodiment of the present invention, rather than MCU containing p FIFOs within group 220 and u FIFOs in group 230, all "predicted active speaker" data for can be collected into a single buffer (i.e., FIFO), tagged with speaker identification information, and then copied to the correct FIFO within group 210 as the predicted active speaker becomes the current active speaker (i.e., during a transition 208).

In another embodiment, all non-active speaker data for a most recent, pre-determined time interval is collected into a single "non-active" speaker buffer, and tagged with speaker identification information. Then, during a transition 208, the buffer would be searched for a speaker's data when they become an active speakers, and a portion of such data (i.e., up to the jitter buffer depth) would be copied to the correct FIFO within group 210.

In yet another embodiment, transition 208 (and the transfer of packets from the FIFOs) would be accomplished by code logic of the Mixer by moving pointers to the FIFO data structures where a FIFO in group 220 would now be identified as being part of group 210, rather than actually moving (or copying) the audio data stored in these FIFO data structures.

Further, as will be apparent to one skilled in the relevant art(s) after reading the description herein, each of the FIFOs in groups 210, 220 and 230, in an embodiment, would have a depth D of at least the desired jitter buffer depth (i.e., $D_{FIFO} \geq M$).

IV. Environment

Figure 4:
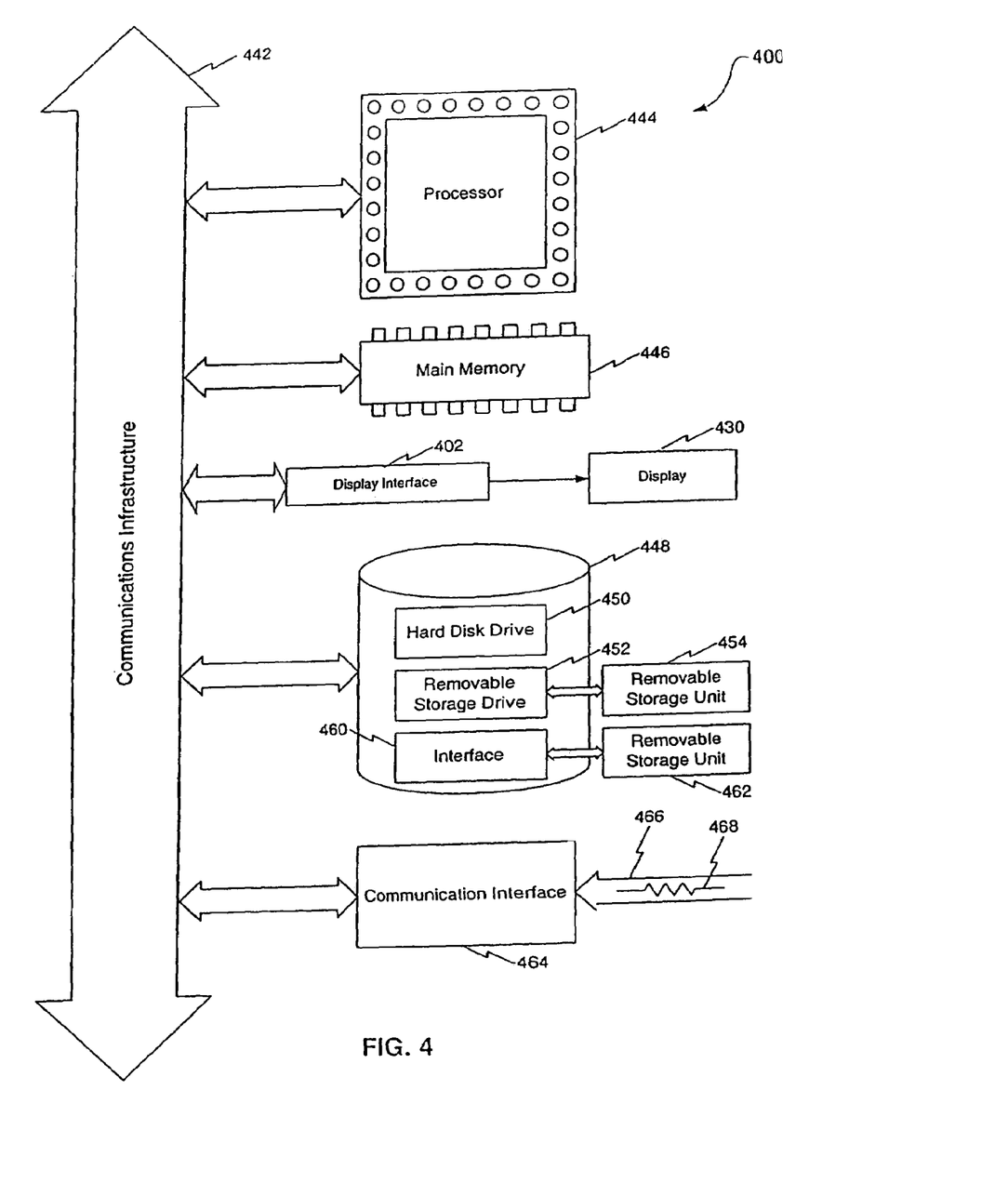
FIG. 4 is a block diagram of an example computer system for implementing the present invention.

The present invention (i.e., system 100, the FIFO groups and transitions of diagram 200, flow 300 or any of the parts thereof) may be implemented using hardware, software or a combination thereof and may be implemented in one or a more computer systems or other processing systems. In fact, an example of a computer system 400 is shown in FIG. 4. The computer system 400 represents any single or multi-processor computer. In conjunction, single-threaded and multi-threaded applications can be used. Unified or distributed memory systems can be used. Computer system 400, or portions thereof, may be used to implement the present invention. For example, the system 100 of the present invention may comprise software running on a computer system such as computer system 400.

In one example, the system 100 of the present invention is implemented in a multi-platform (platform independent) programming language such as JAVA™, programming language/structured query language (PL/SQL), hyper-text mark-up language (HTML), practical extraction report language (PERL), common gateway interface/structured query language (CGI/SQL) or the like. Java™-enabled and JavaScript™-enabled browsers are used, such as, Netscape™, HotJava™, and Microsoft™ Explorer™ browsers. Active content Web pages can be used. Such active content Web pages can include Java™ applets or ActiveX™ controls, or any other active content technology developed now or in the future. The present invention, however, is not intended to be limited to Java™, JavaScript™, or their enabled browsers, and can be implemented in any programming language and browser, developed now or in the future, as would be apparent to a person skilled in the relevant art(s) given this description.

In another example, the system 100 of the present invention, may be implemented using a high-level programming language (e.g., C++) and applications written for the Microsoft Windows™ NT or SUN™ OS environments. It will be apparent to persons skilled in the relevant art(s) how to implement the invention in alternative embodiments from the teachings herein.

Computer system 400 includes one or more processors, such as processor 444. One or more processors 444 can execute software implementing the routines described above. Each processor 444 is connected to a communication infrastructure 442 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 400 can include a display interface 402 that forwards graphics, text, and other data from the communication infrastructure 442 (or from a frame buffer not shown) for display on the display unit 430.

Computer system 400 also includes a main memory 446, preferably random access memory (RAM), and can also include a secondary memory 448. The secondary memory 448 can include, for example, a hard disk drive 450 and/or a removable storage drive 452, representing a floppy disk drive, a magnetic tape drive, an optical disk drive, etc. The removable storage drive 452 reads from and/or writes to a removable storage unit 454 in a well known manner. Removable storage unit 454 represents a floppy disk, magnetic tape, optical disk, etc., which is read by and written to by removable storage drive 452. As will be appreciated, the removable storage unit 454 includes a computer usable storage medium having stored therein computer software and/or data.

In alternative embodiments, secondary memory 448 may include other similar means for allowing computer programs or other instructions to be loaded into computer system 400. Such means can include, for example, a removable storage unit 462 and an interface 460. Examples can include a program cartridge and cartridge interface (such as that found in video game console devices), a removable memory chip (such as an EPROM, or PROM) and associated socket, and other removable storage units 462 and interfaces 460 which allow software and data to be transferred from the removable storage unit 462 to computer system 400.

Computer system 400 can also include a communications interface 464. Communications interface 464 allows software and data to be transferred between computer system 400 and external devices via communications path 466. Examples of communications interface 464 can include a modem, a network interface (such as Ethernet card), a communications port, interfaces described above, etc. Software and data transferred via communications interface 464 are in the form of signals 468 which can be electronic, electromagnetic, optical or other signals capable of being received by communications interface 464, via communications path 466. Note that communications interface 464 provides a means by which computer system 400 can interface to a network such as the Internet.

The present invention can be implemented using software running (that is, executing) in an environment similar to that described above. In this document, the term "computer program product" is used to generally refer to removable storage unit 454, a hard disk installed in hard disk drive 450, or a carrier wave carrying software over a communication path 466 (wireless link or cable) to communication interface 464. A computer useable medium can include magnetic media, optical media, or other recordable media, or media that transmits a carrier wave or other signal. These computer program products are means for providing software to computer system 400.

Computer programs (also called computer control logic) are stored in main memory 446 and/or secondary memory 448. Computer programs can also be received via communications interface 464. Such computer programs, when executed, enable the computer system 400 to perform the features of the present invention as discussed herein. In particular, the computer programs, when executed, enable the processor 444 to perform features of the present invention. Accordingly, such computer programs represent controllers of the computer system 400.

The present invention can be implemented as control logic in software, firmware, hardware or any combination thereof. In an embodiment where the invention is implemented using software, the software may be stored in a computer program product and loaded into computer system 400 using removable storage drive 452, hard disk drive 450, or interface 460. Alternatively, the computer program product may be downloaded to computer system 400 over communications path 466. The control logic (software), when executed by the one or more processors 444, causes the processor(s) 444 to perform functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s) from the teachings herein.

V. Conclusion

While various embodiments of the present invention have been described above, it should be understood that they have been presented by way of example, and not limitation. For example, the operational flow presented in FIG. 3, is for example purposes only and the present invention is sufficiently flexible and configurable such that it may flow in ways other than that shown.

Further, it will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for allocating buffers within a conferencing system, comprising the steps of:
    (1) receiving a packet from a speaker participating in a conference, wherein said speaker is not currently designated as an active speaker;
    (2) testing said packet to determine whether said speaker should be designated as an active speaker;
    (3) discarding the packet when the determination of step (2) is negative; and
    (4) performing the following steps when the determination of step (2) is positive:
        (a) determining whether there is an unallocated buffer from among a set of p active speaker buffers;
        (b) storing said packet in said unallocated buffer when the determination of step (a) is positive;
        (c) identifying, when the determination of step (a) is negative, a buffer from said set of p active speaker buffers that can be reassigned and storing said packet in said identified buffer.

2. The method of claim 1, wherein:
    said testing step determines whether energy of said packet is greater than k percent of the arithmetic mean of energies of speakers currently designated as active speakers.

3. The method of claim 1, wherein:
    said testing step determines whether energy of said packet is greater than k percent of a weighted mean of energies of speakers currently designated as active speakers; and
    said weighted mean weighs more recently received packets in each of the buffers of the speakers currently designated as active speakers more heavily than those received earlier.

4. The method of claim 1, wherein:
    said testing step determines whether energy of said packet is greater than k percent of the minimum energy among energies of speakers currently designated as active speakers.

5. The method of claim 1, wherein step (c) comprises the step of:
    determining which of said set of p active speaker buffers has the lowest mean energy values.

6. The method of claim 1, wherein step (c) comprises the step of:
    determining which of said set of p active speaker buffers has the lowest weighted mean energy values, said weighted mean weighs more recently received packets in each of the buffers more heavily than those received earlier.

7. The method of claim 1, wherein said set p active speaker buffers is a first-in first-out (FIFO) queue.

8. A method for minimizing the loss of data for a plurality of speakers as they participate in a conference, comprising the steps of:
    (1) receiving a plurality of packets from a speaker participating in a conference, wherein said speaker is not currently designated as an active speaker;
    (2) storing said plurality of packets in a "non-active" speaker buffer;
    (3) determining whether said speaker should be designated as an active speaker; and
    (4) when the determination of step (3) is positive:
        (a) allocating one of a set of p active speaker buffers to said speaker; and
        (b) transferring at least one of said plurality of packets from said non-active speaker buffer to said one of said set of p active speaker buffers allocated to said speaker.

9. A computer program product comprising a computer usable medium having control logic stored therein for causing a computer to provide buffer allocation to packets received from a plurality of speakers within a conference, said control logic comprising:
    first computer readable program code means for causing the computer to receive a packet from a speaker participating in a conference, wherein said speaker is not currently designated as an active speaker;
    second computer readable program code means for causing the computer to test said packet to determine whether said speaker should be designated as an active speaker;

third computer readable program code means for causing the computer to discard the packet when the determination of said second computer readable program code means is negative; and fourth computer readable program code means for causing the computer to perform the following steps when the determination of said second computer readable program code means is positive:

fifth computer readable program code means for causing the computer to determine whether there is an unallocated buffer from among a set of p active speaker buffers;

sixth computer readable program code means for causing the computer to store said packet in said unallocated buffer when the determination of said fifth computer readable program code means is positive;

seventh computer readable program code means for causing the computer, when the determination of said fifth computer readable program code means is negative, to identify a buffer from said set of p active speaker buffers that can be reassigned and storing said packet in said identified buffer.

10. The computer program product of claim 9, wherein said set of p active speaker buffers is a first-in first-out (FIFO) queue.

11. A computer program product comprising a computer usable medium having control logic stored therein for causing a computer to minimize the loss of audio data for a plurality of speakers as they participate in a conference, said control logic comprising:

first computer readable program code means for causing the computer to receive a plurality of packets from a speaker participating in a conference, wherein said speaker is not currently designated as an active speaker;

second computer readable program code means for causing the computer to store said plurality of packets in a "non-active" speaker buffer;

third computer readable program code means for causing the computer to determine whether said speaker should be designated as an active speaker;

fourth computer readable program code means for causing the computer to allocate, when the determination of said third computer readable program code means is positive, one of a set of p active speaker buffers to said speaker; and fifth computer readable program code means for causing the computer to transfer, when the determination of said third computer readable program code means is positive, at least one of said plurality of packets from said non-active speaker buffer to said one of said set of p active speaker buffers allocated to said speaker.

* * * * *